United States Patent [19]

Kessler

[11] Patent Number: 5,018,805
[45] Date of Patent: May 28, 1991

[54] LASER PRINTER

[75] Inventor: David Kessler, Rochester, N.Y.

[73] Assignee: Eastman Kodak Company, Rochester, N.Y.

[21] Appl. No.: 422,382

[22] Filed: Oct. 16, 1989

[51] Int. Cl.$^5$ ............... G02B 26/08; G02B 27/14; G01D 15/14
[52] U.S. Cl. ................... 350/6.5; 350/174; 346/160
[58] Field of Search ........... 350/6.5, 6.7, 6.8, 174, 350/96.18; 346/160, 108; 250/234–236

[56] References Cited

U.S. PATENT DOCUMENTS

| | | | |
|---|---|---|---|
| 3,041,916 | 7/1962 | Clave et al. | 88/1 |
| 4,099,830 | 7/1978 | Whittle et al. | 350/6.8 |
| 4,574,197 | 3/1986 | Kliever | 250/334 |
| 4,588,269 | 5/1986 | Kessler | 350/619 |
| 4,619,892 | 10/1986 | Simpson et al. | 430/505 |
| 4,637,679 | 1/1987 | Funato | 350/174 |
| 4,643,569 | 2/1987 | Sullivan et al. | 356/237 |
| 4,728,965 | 3/1988 | Kessler et al. | 346/108 |
| 4,911,532 | 3/1990 | Hidaka | 350/174 |
| 4,946,233 | 8/1990 | Seto | 350/6.5 |
| 4,947,039 | 8/1990 | Lawson et al. | 350/6.7 |
| 4,948,221 | 8/1990 | Yates | 350/96.20 |

Primary Examiner—Bruce Y. Arnold
Assistant Examiner—James Phan
Attorney, Agent, or Firm—Donald D. Schaper

[57] ABSTRACT

A laser printer is disclosed which is adapted to be used for color imaging. The printer comprises three diode lasers, each of which emits a light beam at a different wavelength. Each of the light beams passes along a separate channel to a pair of dichroic plates which combine the three beams into a single combined beam. The combined beam is scanned by a polygon onto a receiving medium which is sensitive to the infrared. Two cylindrical lenses in each channel are used to focus the beam in the channel at a registration plane located after the beam combining means. An optical relay is used to transfer the combined beam from the registration plane to the polygon and to focus the beam in a cross-scan direction on the polygon. The polygon is optically conjugated to the image plane in order to achieve cross-scan error correction.

14 Claims, 3 Drawing Sheets

LASER PRINTER

CROSS REFERENCE TO RELATED APPLICATIONS

Reference is made to U.S. patent applications: Ser. No. 422,381, entitled "Beam Position Sensor For A Light Beam Scanner," filed in the name of D. Kessler et al. on even date herewith, and Ser. No. 422,350, entitled "F-Θ Lens," filed in the name of D. DeJager on even date herewith. These applications are assigned to the assignee of the present invention.

BACKGROUND OF THE INVENTION

1. Field of the Invention

This invention relates to a laser printer, and more particularly, to such a printer which is adapted to record a color image on a photographic film.

2. Description of the Prior Art

Laser printers are used in photography and in the graphic arts for printing on a receiving medium such as film. When such printers are used for color imaging, they generally include a separate channel for each of the primary colors. In U.S. Pat. No. 4,728,965, for example, there is disclosed a laser printer which includes three optical channels, and each channel includes a gas laser which projects a beam of intense coherent light at a predetermined wavelength. The intensity of the light beam in each channel is modulated by an acoustooptic modulator in accordance with an electrical signal representing image information for one of the primary colors. The three beams of light are combined by a beam combiner, and the combined light beam is scanned onto a receiving medium by a rotating polygon.

In recent years, there have been attempts to use diode lasers instead of gas lasers in laser printers. The use of diode lasers reduces the cost of the printer and permits a drastic reduction in the size and complexity of the printer. Diode lasers can be modulated directly at frequencies as high as several hundred MHz by simply modulating the drive current, and thus, no external modulators are required. Further, the low intrinsic noise of diode lasers makes it possible to eliminate the high-bandwidth servo controls used for noise cancellation in gas laser printers. There are, however, problems which have to be solved in using diode lasers in printers for the graphics arts. One of the problems is that available gallium aluminum arsenide diode lasers emit in the infrared. As a result, a special recording material which is sensitive to the infrared must be used, and the diode lasers in a multilaser system must be carefully selected to obtain the widest possible spectral separation between the lasers.

There are also optical problems involved in combining the diode laser beams for color systems and and in controlling the combined beam to obtain high-quality, continuous tone images. One of the factors which makes the control of the beams more difficult is that the optics must be confined to a relatively small space in the more compact diode laser printers. The optics must be arranged to focus the beam on the polygon to control facet pyramid error, and the optics must also control the size of the beam such that aberrations induced by the optics are not prohibitively large.

SUMMARY OF THE INVENTION

It is an object of the present invention to overcome the problems discussed above of combining and controlling multiple beams in a diode laser printer.

In accordance with one aspect of the invention, there is provided a laser printer comprising: a plurality of optical heads, each of the optical heads including a laser which is adapted to emit a light beam at a wavelength different from the other lasers, at least some of the lasers being diode lasers; means for modulating the light beam from each of the lasers in accordance with an information signal; means for focussing the beams in a cross-scan direction at a registration plane; means for receiving the beams from the focussing means and for combining the beams to form a combined beam of light which passes through the registration plane; means for relaying the combined beam from the registration plane to a scanning means; means for scanning the combined beam onto a receiving medium; means for effecting relative movement between the receiving medium and the scanning means in a cross-scan direction; and means for controlling the modulating means, the scanning means, and the means for effecting relative movement in timed relation to each other.

In one embodiment of the present invention, a laser printer comprises three diode lasers which are mounted in a generally linear arrangement. Each of the lasers emits light at a different wavelength, and each laser beam is modulated in accordance with an image signal which represents one of the primary colors. Each of the laser beams is passed through cylindrical lenses which focus the beam at a registration plane, and after passing through the cylindrical lenses, the beams are superimposed by means of two dichroic plates to form a combined beam. The combined beam is relayed from the registration plane to a polygon by two cylindrical mirrors and a flat mirror. The combined beam is reflected off the polygon to an f-Θ color-corrected scanning lens. A cylindrical mirror, located between the polygon and the receiving medium, serves to image a polygon facet, in the cross-scan direction, onto the receiving medium.

A principal advantage of the present invention over known laser printers is that the size and complexity of the printer has been substantially reduced, and the reliability has been improved. The diode lasers can be modulated directly at frequencies as high as several hundred MHz by simply modulating the drive current, and thus, no external acoustooptic modulators and associated optics are required. The laser beams in the disclosed printer are focussed, combined, and relayed in a manner to give optimum performance.

Other features and advantages will become apparent upon reference to the following description of the preferred embodiment when read in light of the attached drawings.

DESCRIPTION OF THE PREFERRED EMBODIMENT

Figure 1:
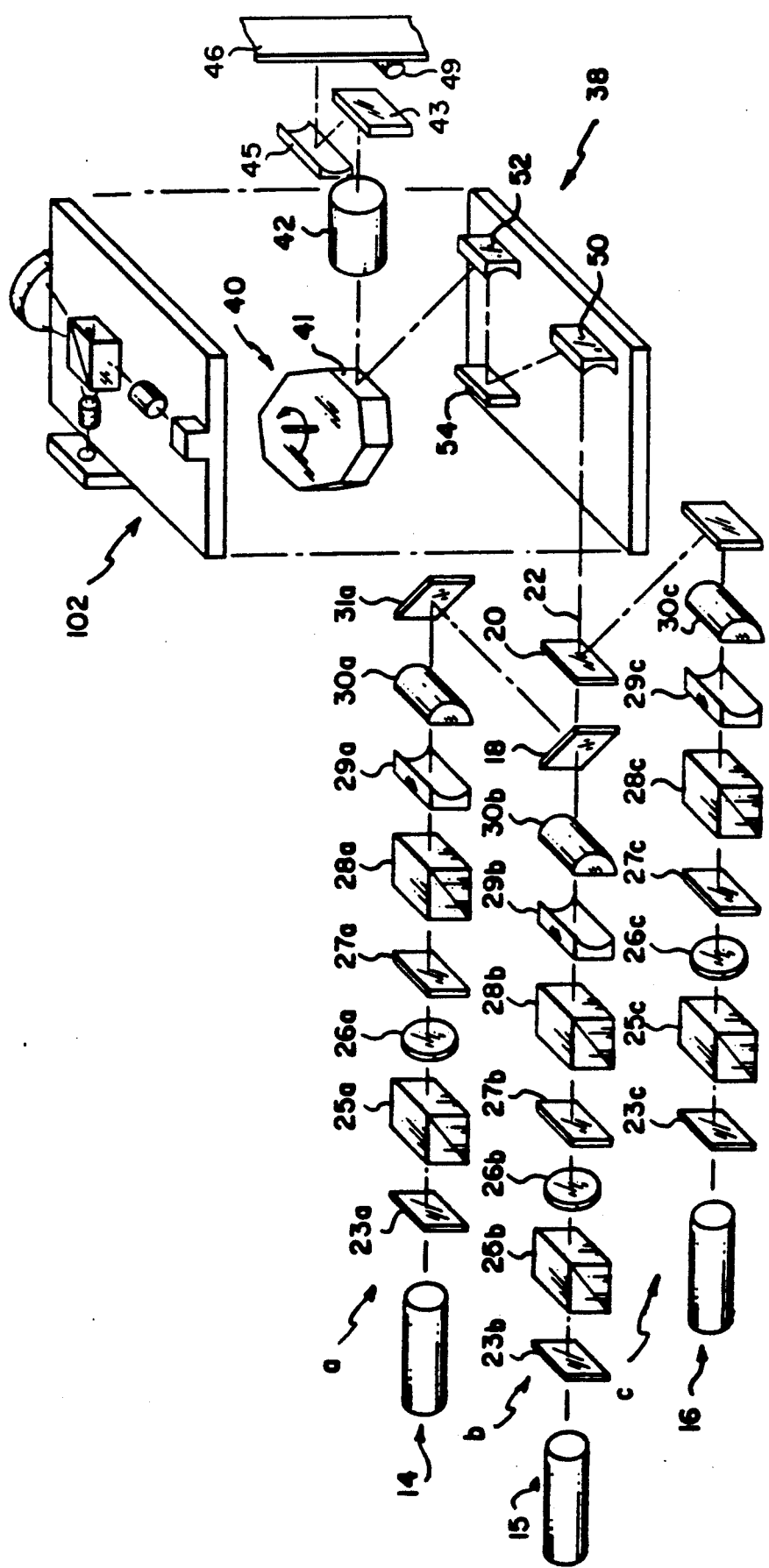
FIG. 1 is a perspective view of the laser printer of the present invention.

With reference to FIG. 1, there is shown a diode laser printer 10 constructed in accordance with the present invention. Printer 10 comprises three optical heads which are designated 14, 15, and 16. The optical heads 14-16 are disposed in a generally linear arrangement. Beams from optical heads 14-16 are combined by dichroic plates 18 and 20. A combined beam from plates 18 and 20 travels along an optical axis 22 to relay optics 38.

The combined beam from relay optics 38 is directed onto a rotatable polygon 40. Polygon 40 directs the beam to an f-Θ lens 42 which can be constructed as shown in the aforementioned U.S. application, Ser. No. 442,350, entitled "F-Θ Lens." From lens 42, the beam passes to a flat mirror 43 which directs the beam onto a cylindrical mirror 45. Cylindrical mirror 45 directs the beam onto a receiving medium 46. Receiving medium 46 is adapted to be advanced by means of, for example, a drum 49, or sprocket (not shown), in timed relation to the movement of the beam across the medium.

Printer 10 can be used to print on any medium which is sensitive to light. However, a preferred usage of the present invention is in a film/electronic motion picture post-production system. In such a system, a digitized image is printed in a cine format on an infrared-sensitive 35 mm film. In this application, it has been found that the printer 10 can produce very high resolution on the film, for example, 3500 pixels per inch.

Each of the optical heads 14-16 can be constructed as disclosed in commonly-assigned U.S. patent application Ser. No. 238,225, entitled "Athermalized Optical Head," filed Aug. 30, 1988, in the name of Thomas E. Yates, and the disclosure in application Ser. No. 238,225, now U.S. Pat. No. 4,948,229 is expressly incorporated herein by reference. As disclosed in this application, each optical head comprises a diode laser, a collimator lens, a thermoelectric cooler, and a mounting for maintaining a constant distance between the laser and the collimator lens over a predetermined temperature range.

In order to achieve good tone and color reproduction, the diode lasers in printer 10 must have the widest possible spectral separation and dynamic range. The laser in optical head 14 emits at 810 nm (5 mW) and can be a number LT010MF, obtainable from the Sharp Corporation. The laser in optical head 15 emits at 870 nm (20 mW) and can be a number 8312E, manufactured by Hitachi Corporation. The laser in optical head 16 emits at 750 nm (5 mW) and can be, for example, a number LT030MF, which is manufactured by Sharp Corporation. Although diode lasers having shorter wavelengths are now available, it has been found that their dynamic range, that is the ratio of maximum power to power at the lasing threshold, is inadequate for continuous-tone printing.

The beams from optical heads 14, 15, and 16 pass through channels a, b, and c respectively, and each of the channels includes generally similar optical elements between the optical head and dichroic plates 18 and 20 which combine the beams. The beam from optical head 14 passes through an aperture plate 23a, a first linear polarizer 25a, a half-wave plate 26a, a shutter 27a, a second linear polarizer 28a, a concave cylindrical lens 29a, a convex cylindrical lens 30a, and a flat mirror 31a. The function of the linear polarizers 25a and 28a is to filter spontaneous emission from the diode laser and thereby increase the dynamic range of printer 10. Polarizers 25a and 28a, in conjunction with half-wave plate 26a, permit the color balance and exposure to be adjusted to the proper values for the recording medium 46 being used at the exposure plane. Cylindrical lenses 29a and 30a function to focus the beam at a registration plane 32 (FIG. 2) which is located, in the direction of beam advancement, after the plates 18 and 20. Cylindrical lens 29a can have, for example, a radius of curvature of 19.667 mm, and cylindrical lens 30a can have a radius of curvature of 32.301 mm. The optical elements in channel a are identical to the optical elements in channel c. The optical elements in channel b are identical to elements in channel a, with the exception of the radius of curvature of cylindrical lens 29b which can be, for example, 37.63 mm.

The three beams in channels a, b, and c are superimposed using two slightly-wedged dichroic plates 18 and 20. As shown in FIG. 1, plates 18 and 20 are disposed such that the normals to plates 18 and 20, respectively, are both at a 30° angle to the optical axis 22, and the plates 18 and 20, each form an angle of 60° with optical axis 22. Plates 18 and 20 are at an angle of 60° to each other. The beam from optical head 14 impinges on plate 18 at a 30° angle of incidence and is combined with the beam from optical head 15. The beam from optical head 16 impinges on plate 20 at a 30° angle of incidence and is superimposed on the beams from heads 14 and 16 to form a combined beam which is directed along optical axis 22 to the optical relay 38.

The use of optical relay 38 is an important feature of the present invention in that it provides a means for focussing the combined beam on the polygon 40 without having to increase the size of the printer 10 and without having to use prohibitively large beams at the cylindrical lenses 29 and 30. When a polygon, such as polygon 40, is used as the scanning device, it is necessary to correct for pyramid facet error. In order to correct for this error, the polygon is optically conjugated to the image plane. Since the beam size at the image is small, the spot size in the cross-scan direction is small as a result of the conjugation. In the scan direction, the beam size is relatively large and collimated, or nearly collimated. Thus, the combined beam as it approaches the polygon 40 is collimated in the scan direction and focused in the vicinity of the polygon 40 in the cross-scan direction. In order to focus the beam in the cross-scan direction, the two cylindrical lenses (29a-29c and 30a-30c) are used in each channel. The distance from these lenses to the polygon 40 has to be large enough to provide room for the beam combining optics, plates 18 and 20, and to allow for convenient layout of the polygon 40, dichroic plates 18 and 20, and the f-Θ lens 42. Providing this large distance necessitates large beams in the cross-scan direction at the cylindrical lenses (29a-29c and 30a-30c) in each channel, and this results in large aberrations being induced in these lenses. The solution to this problem, according to the present invention, is to have the combined beam focus in the cross-scan direction at the registration plane 32 located right after the beam combining optics, plates 18 and 20, thereby making the distance from the focussed spot to the cylinder lenses as short as possible, and to then use the optical relay 38 to convey the small focused beam, in the cross-scan direction, to the polygon 40.

Figure 2:
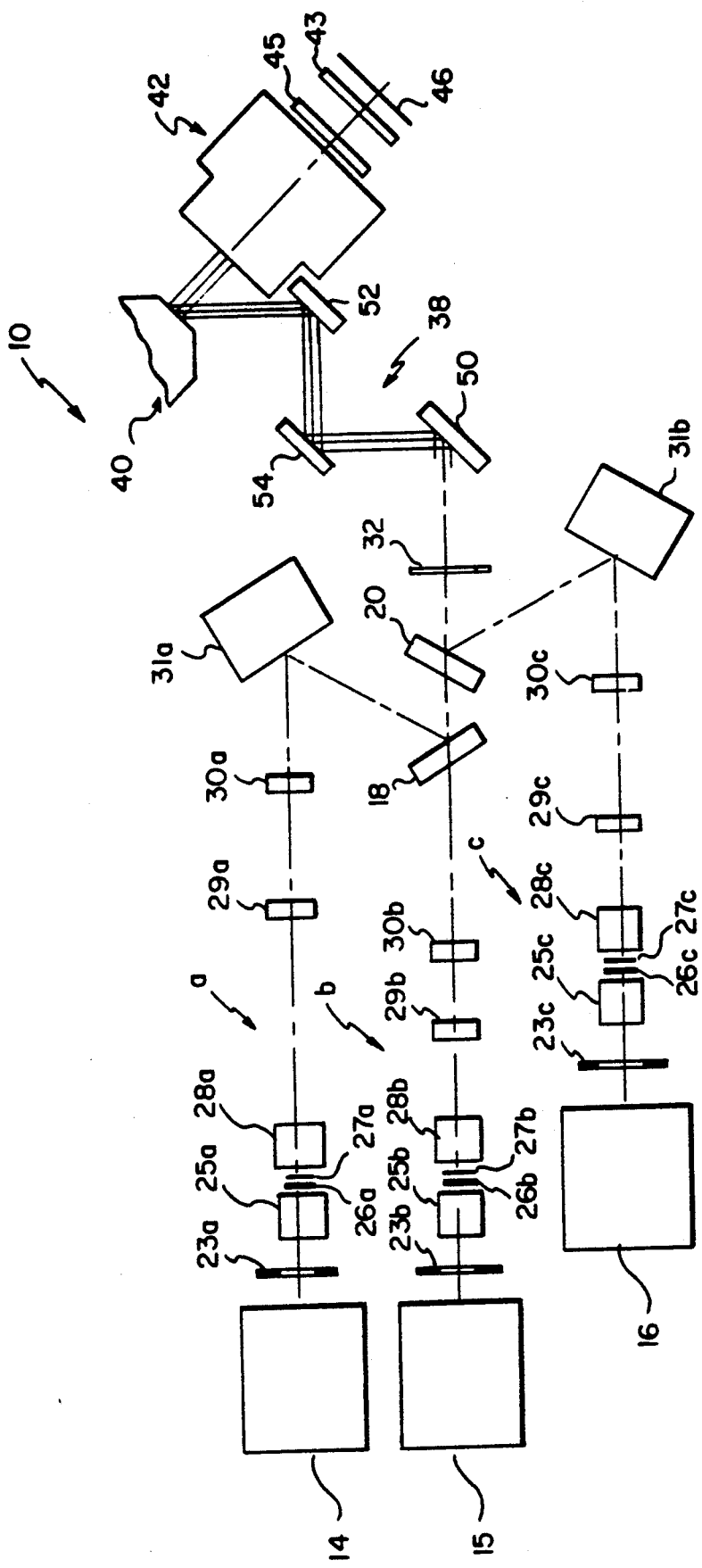
FIG. 2 is a top plan view of the printer.

Relay 38 must be color corrected, and as shown in FIGS. 1 and 2, relay 38 comprises cylindrical mirrors 50 and 52 and a flat mirror 54. Mirrors 50 and 52 have power in the cross-scan direction, and the axes of the mirrors 50 and 52 are in the scan plane, or meridional plane, which is the plane of the drawing as shown in FIG. 2. Each of the cylindrical mirrors 50 and 52 is a concave cylindrical mirror and has a radius of curvature of 57.1 mm. It will be apparent from FIGS. 1 and 2 that mirrors 50 and 52 could be replaced by one continuous cylindrical mirror (not shown). In the scan direction, the beam directed to relay 38 is relatively large, collimated, and propagates unaffected through the relay. In the cross-scan direction, cylindrical mirror 50 recollimates the beam, and cylindrical mirror 52 focusses the beam on the polygon 40.

Polygon 40 can have, for example, 18 facets 41, and the polygon can be rotated at a speed of 8,690 rpm. Polygon 40 has diamond-machined facets 41, rotates on a self-pumped air bearing (not shown), and is controlled by a phase-locked servo system. A combination polygon and drive motor suitable for printer 10 is a Model No. ZS-009, manufactured by Copal Company Ltd.

For high-quality continuous-tone imaging, objectionable banding artifacts, such as those due to wobble or pyramid angle error in the polygon 40, must be reduced below visible levels. Generally the variation in pixel placement must be kept below one one-thousandth of the pixel spacing to avoid visible artifacts. In the present invention, cylindrical mirror 45 images the scanner plane onto the image plane in the cross-scan direction. The magnification is selected so that the residual out-of-plane motion of the polygon facet, as it rotates, does not result in excessive spot misplacement at the end of the scan. A cylindrical mirror which can be used in the present invention has a radius of curvature of 37.633 mm.

Figure 3:
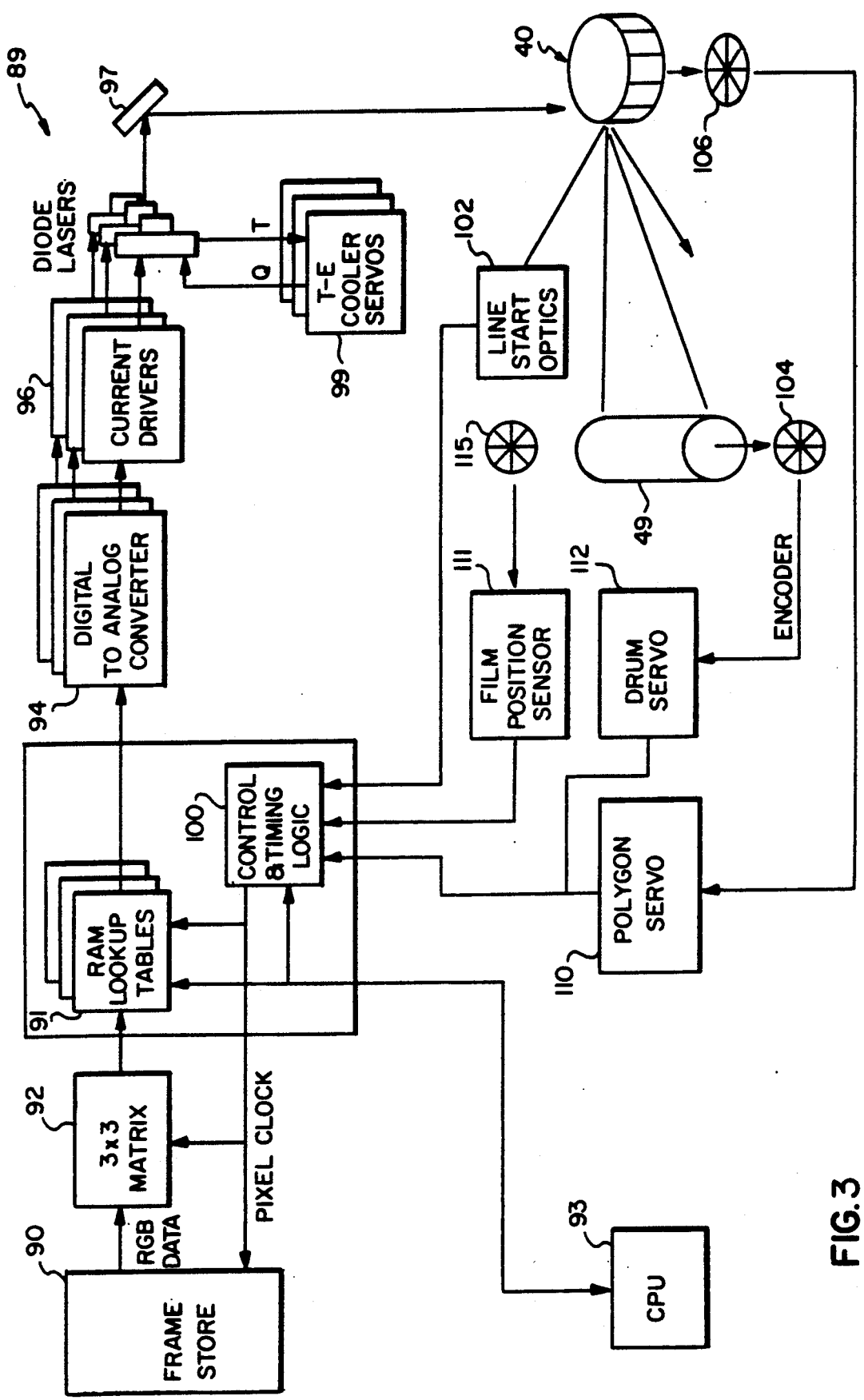
FIG. 3 is a block diagram of the electronic elements in the printer of the present invention.

A control system 89 for printer 10 is shown in FIG. 3. Control system 89 comprises a frame store 90 for storing image data received from an image scanner or from an image storage medium (not shown). The data stored in frame store 90 includes, for example, three 8-bit values for each pixel, each value representing the red, green, or blue input for the pixel. A matrix multiplication circuit 92 multiplies the 8-bit red, green, and blue values by a 3×3 matrix in order to effect desired color corrections.

The output from circuit 92 is applied to RAM lookup tables 91 which perform the necessary scaling for linearization, calibration, compensation for the mismatch of the sensitometric curves of the three color layers of the recording material, and correction for facet-to-facet reflectivity variations of the polygon 40. Updated values for the lookup tables 91 can be provided by a central processing unit 93. The digital outputs from lookup tables 91 are provided to digital-to-analog (D/A) converters 94, and the outputs from the D/A converters drive the voltage-to-current drivers 96 for the diode lasers designated 97. Thermoelectric coolers (not shown) for the diode lasers 97 are controlled by thermoelectric cooler servos 99.

A control and timing logic circuit 100 is provided to manage the data flow during the operation of printer 10 and to control the printer timing. Circuit 100 accepts timing signals from a drum servo 112, a polygon servo 110, a film position sensor 111, and a beam position, or line-start, sensor 102. These timing signals include a once-per-revolution pulse from drum servo 112 which receives inputs from an encoder 104, a once-per-facet pulse from servo 110 which receives inputs from an encoder 106, a once-per-frame pulse from film position sensor 111 which receives inputs from an encoder 115, and a line-start pulse that is generated when the laser beam crosses a photodetector (not shown) in sensor 102. Upon receipt of these signals, a pixel clock is started and the data is clocked through the data circuits. Also included in circuit 100 are a pixels-per-line counter for line length control and a facet counter for controlling the addressing of the lookup tables 91. The beam position sensor 102 can be constructed as disclosed in the aforementioned U.S. application, Ser. No. 422,381, entitled "Beam Position Sensor For a Light Beam Scanner."

Receiving medium 46 can be, for example, a silver halide false sensitized color film or color paper. One such a medium is disclosed in U.S. Pat. No. 4,619,892, granted on Oct. 28, 1986. The diode lasers used in the present invention have been selected to obtain the widest possible spectral separation. However, since the wavelength separation of the diode lasers is relatively small, 750 to 870 nm, the color paper must have sufficient speed differentials, as well as narrow spectral response, in order to give good color separation and reproduction without punch-through. Since a false-color system is being used, the layer forming a given image dye color can be any of the layers (top, middle, or bottom) and exposed by any of the three wavelengths.

This invention has been described in detail with particular reference to the preferred embodiment thereof, but it will be understood that variations and modifications can be effected within the spirit and scope of the invention.

I claim:

1. A laser printer comprising:
   a plurality of optical heads, each of said optical heads including a laser which is adapted to emit a light beam at a wavelength different from the other lasers, at least some of said lasers being diode lasers;
   means for modulating the light beam from each of said lasers in accordance with an information signal;
   means for focussing said beams in a cross-scan direction at a registration plane;
   means for receiving said beams from said focussing means and for combining said beams to form a combined beam of light which passes through said registration plane;
   means for relaying said combined beam from said registration plane to a scanning means, said relaying means including means for focussing said combined beam in a cross-scan direction on said scanning means;
   means for scanning said combined beam onto a receiving medium;
   means for effecting relative movement between said receiving medium and said scanning means in a cross-scan direction; and
   means for controlling said modulating means, said scanning means, and said means for effecting relative movement in timed relation to each other.

2. A printer, as defined in claim 1, wherein said relaying means comprises cylindrical mirror means and a flat mirror.

3. A printer, as defined in claim 2, wherein said cylindrical mirror means includes first and second cylindrical mirrors, and said flat mirror is disposed between said cylindrical mirrors.

4. A printer, as defined in claim 3, wherein said cylindrical mirrors are disposed with their axes in the plane through which said beam is scanned by said scanning means.

5. A printer, as defined in claim 4, wherein said first cylindrical mirror collimates said combined beam, and said second cylindrical mirror focusses said combined beam in a cross-scan direction on said scanning means.

6. A printer, as defined in claim 5, wherein a third cylindrical mirror is disposed between said scanning means and said receiving medium.

7. A printer, as defined in claim 1, wherein said scanning means is a rotatable polygon.

8. A printer, as defined in claim 1, wherein said printer includes three optical heads, and each of said optical heads includes a diode laser.

9. A printer, as defined in claim 8, wherein one of said diode lasers emits at about 750 nm, another of said lasers emits at about 810 nm, and the other laser emits at about 870 nm.

10. A printer, as defined in claim 8, wherein each of said optical heads is an athermalized optical head.

11. A printer, as defined in claim 1, wherein said receiving medium is an infrared-sensitive medium.

12. A printer, as defined in claim 1, wherein said receiving medium is a silver halide false-sensitized color medium.

13. A printer, as defined in claim 1, wherein said modulating means includes a driver for supplying the information signal to each of said diode lasers, and the information signal to each of the lasers contains information for one of the primary colors.

14. A printer, as defined in claim 1, wherein said receiving medium is supported on a rotatable drum.

* * * * *